W. M. HENDERSON.
Hydraulic Car-Brake.
No. 159,511. Patented Feb. 9, 1875.
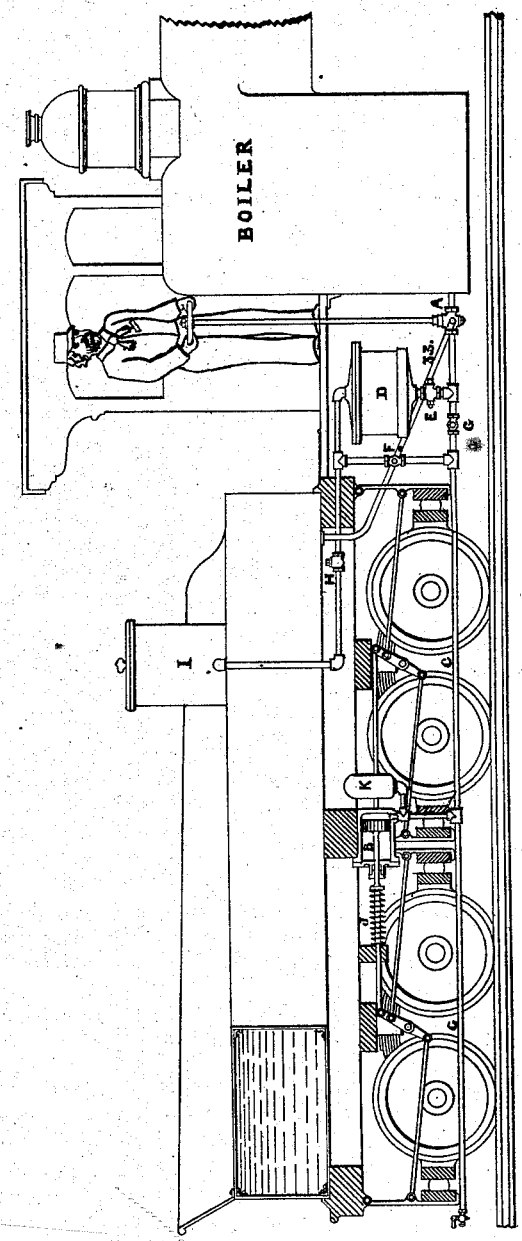
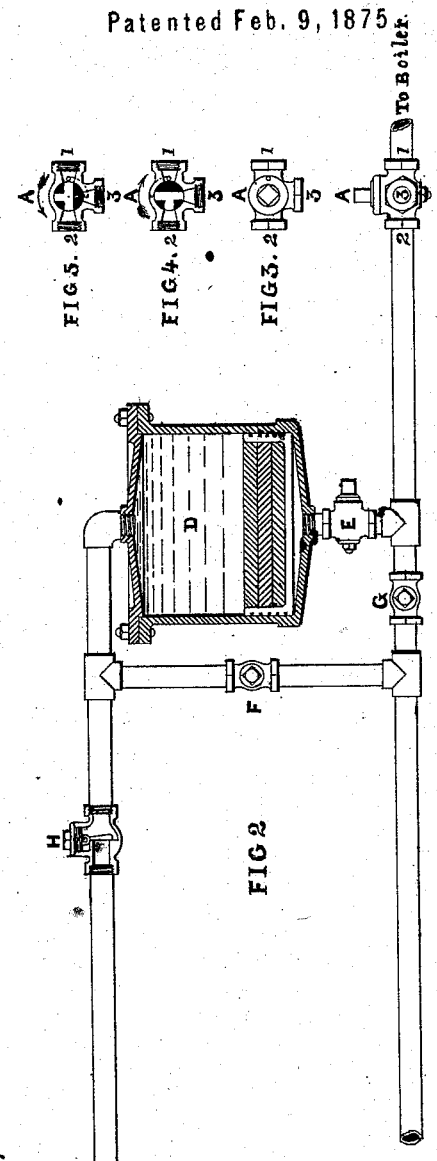
WITNESSES.
INVENTOR
William M. Henderson

UNITED STATES PATENT OFFICE.

WILLIAM M. HENDERSON, OF PHILADELPHIA, PENNSYLVANIA.

IMPROVEMENT IN HYDRAULIC CAR-BRAKES.

Specification forming part of Letters Patent No. 159,511, dated February 9, 1875; application filed September 22, 1873.

CASE A.

*To all whom it may concern:*

Be it known that I, WILLIAM M. HENDERSON, of Philadelphia, Pennsylvania, have invented certain Improvements in Railroad-Car Brakes, of which the following is a specification:

This invention is intended as an improvement upon the patent granted to myself by the United States Patent Office for an improvement in hydraulic car-brakes, one feature of which improvement consisted in using water taken from the tender, or other special tank, or other convenient source of supply, to charge the main leading to the brake-cylinders.

Now, I have since discovered that in certain latitudes of this country—say north of Mason and Dixon's line—there would be during the winter portion of the year a liability to freezing of the water so employed. To overcome this temporary objection, and to make the apparatus equally serviceable during this period in the Northern States as it already is for the Southern States, is the object of the present improvement.

The principle involved in the operation of this brake is that of hydraulic pressure, and the motive power is derived directly from the steam-boiler of the locomotive. All auxiliary machinery, such as air-compressing pumps and receivers, or other descriptions of pumps, hydraulic or otherwise, are entirely dispensed with, the brakes being under the control and manipulated by the engine-driver.

The construction of the apparatus will be seen by reference to the accompanying drawing, in which—

Figure 1 is a longitudinal elevation, showing the general arrangement of the improvement as applied to practical work. Fig. 2 is an enlarged view of what constitutes the improvement proper; and Figs. 3, 4, and 5 show different views of the two-way cock or regulator which governs the operation of the brakes.

This two-way cock is marked A in the several figures, and it is placed underneath the foot-plate of the engine, the plug of which cock is actuated by a stem carried up through the foot-plate, and furnished with a hand-wheel or handle at top, placed convenient to the hand of the engine-driver. The nozzle marked 1 is connected by a piece of wrought-iron pipe directly to the water-space of the boiler. The opposite nozzle, marked 2, is connected by wrought-iron pipe and flexible hose-connections furnished with suitable couplings between the cars, as usual in such cases, and leads directly to the pressure-cylinders B, one or more of which is provided beneath the body of each car, the working-piston of such cylinders being connected with a system of levers, as shown, for operating the brakes. The third nozzle of the two-way cock, marked 3, is connected directly to the water-tank supplying the boiler with water. At the end of the main C is a small pet-cock, as shown, for discharging the air and facilitating the proper charging of the same with the fluid to be used as the agent for operating the brake-cylinder pistons. The whole of these features are the same as before described in the patent granted to me.

The main feature of the present improvement is embraced in what is shown by Fig. 2 upon the drawing, and consists in interposing a cylinder, D, furnished with suitable cocks E, F, and G, check-valve H, and tank I, to supply a non-freezing fluid for the purpose of operating the brake-cylinders, such as glycerine, or a mixture of glycerine and water, petroleum, or other substance of a similar character, as may be found best adapted to the purpose, all of which I will now more fully describe.

D is a cylinder bored out true, into which is fitted a piston, as shown, furnished with weights of cast-iron to facilitate the return of it to the starting-point after the brakes have been operated. It is obvious a spring may be employed instead of the weights, which I have shown as being less intricate. It is also equally obvious that instead of a piston moving in a cylinder a flexible diaphragm or bellows might be used to answer the same purpose. As the pressure on either side of whatever is interposed will be the same during its operation, the medium is, therefore, a mere separator, preventing the fluids on either side of it from commingling. This cylinder is connected to the main C by a short tubular connection, as shown, furnished with a stop-cock, E. Leading away from the other end of this cylinder is another tube-connection, which makes an advanced connection with the main, and is also furnished with a stop-cock, F. Between the points of junction of these two connections there is placed another stop-cock, G.

This device will only be required to be used three or four months during the year in the Northern States, and will be altogether unnecessary in the Southern States. It may be made attachable to the main by union-couplings, can be altogether removed during the greater portion of the year, and can be brought into play or isolated at any time by a proper adjustment of the several cocks. For instance, if the cocks E and F are shut and G opened, the brakes will be operated entirely by water from the tender-tank, according to the method described in my former patent.

When required to be brought into service in the nature of the present improvement its operation is as follows:

The cylinder D is filled with a non-freezing liquid, preferably glycerine and water in equal parts, which is safe down to about 30° below zero. Glycerine itself never freezes. The cock G will be closed, and E and F opened. Direct communication with the main leading to the brake-cylinders is now shut off, and whatever fluid is used to operate their pistons must come solely from the cylinder D, which is made of a capacity to contain sufficient fluid to charge the maximum number of brake-cylinders usually employed on a train of cars. In order that this cylinder D shall remain at all times fully charged with fluid, a tank or reservoir, I, is provided, containing an excess quantity. The pipe proceeding from this tank to the cylinder D has a check-valve, H, fitted to it, opening toward the cylinder, so that this result must be fully accomplished. A disposition of the fluid to return to the tank, consequent upon the projection of the piston in the cylinder D, is checked at once by the closing of the valve H, as will be seen by reference to its action.

The general operation of the entire apparatus is as follows: Steam being up in the boiler, and the connections of the main being all coupled between the several cars, the engine-driver passes to the end of the main and opens the small air-cock, and allows the fluid to travel to its extreme end, which it will do by virtue of the head contained in the tank I. The air will then all be expelled, and when he finds such to be the case, by the fluid commencing to discharge, he closes the cock and returns to the engine, and is prepared to start. We will now suppose the train in motion, and it is desired to apply the brakes. He will simply turn the plug of the two-way cock, so as to make a communication between the boiler and the cylinder D, as shown by Fig. 5. It will be observed in doing this that all communication with the water-tank will have been shut off. Now, then, the pressure within the boiler will exert itself with its full force upon the under side of the piston within the cylinder D, and produce a hydrodynamic pressure equal to the pressure within the boiler upon each square inch of its surface, which will be transferred in turn to the fluid on the other side of it, and which again will communicate the same pressure per square inch to the area presented by the pressure-cylinder pistons when turned on full head; or the pressure to be applied can be varied by partially opening the cock A.

It will thus be seen that the boiler itself becomes the reservoir of accumulated pressure, and that the same power can be employed directly to the purpose of operating the brakes, as would be the case if it were used through the medium of auxiliary pumping machinery as generally employed, all of which is by this improvement done away with and rendered unnecessary.

To take the pressure off the pistons of the pressure-cylinders and release the brakes, the engine-driver will turn the plug of the two-way cock again, so as to open a communication with the water-tank, as shown by Fig. 4. This operation also shuts off all communication with the boiler, and, of course, destroys the hydraulic pressure. The hot water under pressure, being freed by this movement, will find an avenue of escape into the water-tank by the connection (shown upon Fig. 1) marked 3 3. The fluid, after having performed its duty, will return to the cylinder D as the piston therein makes room for it.

In order that the force of applying the brakes shall not be of an objectionable concussive or jarring nature, an air-vessel, K, is arranged in close proximity to the brake-cylinder B, which will furnish a cushion of air to relieve all such concussion or jarring. The compression of this air will also react upon the fluid when the brakes are released, to force the same back through the main to the cylinder D. The recoil of the brake-pressure pistons is directly produced by springs J, compelling the fluid to return to this cylinder.

Between the body of the two-way cock and its plug there is, it will be observed, a stop, obviously arranged, as shown upon Figs. 3, 4, and 5, in such manner that the plug can never be turned so as to open a communication between the boiler and the water-tank.

I hereby disclaim the combination of a glycerine-tank connected with a tube conveying pressure to the brake-cylinders, and provided with a check-valve controlling the passage from said tank to said tube when said tube is connected with tubes leading to the boiler and to the water-tank, and susceptible of fluid communication alternatively with the water-tank and boiler.

I claim as my invention—

1. The arrangement of an intermediate cylinder, D, with fluid-reservoir I, cocks E F G, and valve H, in combination with a two-way cock, A, connected as described, when used to actuate pistons or plungers of hydraulic cylinders by fluid-pressure derived from a boiler, substantially in the manner and for the purpose shown and described.

2. The combination of the two-way cock A, the hydraulic-pressure cylinder B, with the air-vessel K, in the manner and for the purpose set forth and described.

WILLIAM M. HENDERSON.

Witnesses:
BARTON H. JENKS,
T. J. LOVEGROVE.